Sept. 4, 1951 S. C. ALEXANDER 2,566,757
HEADREST
Filed March 19, 1948
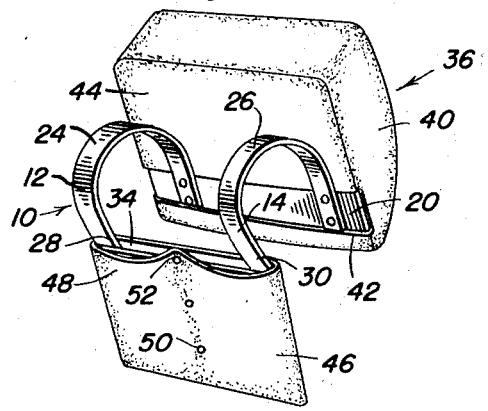
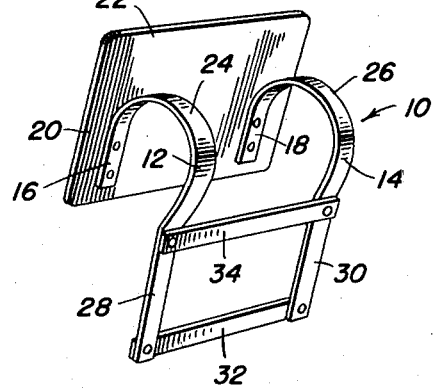
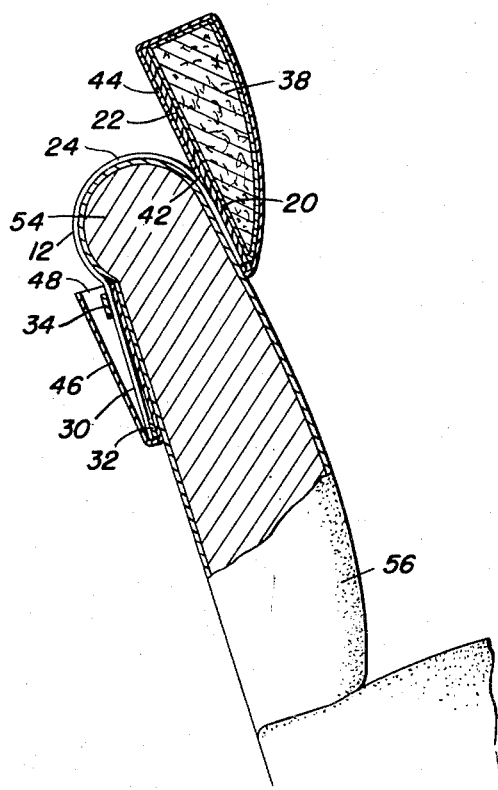
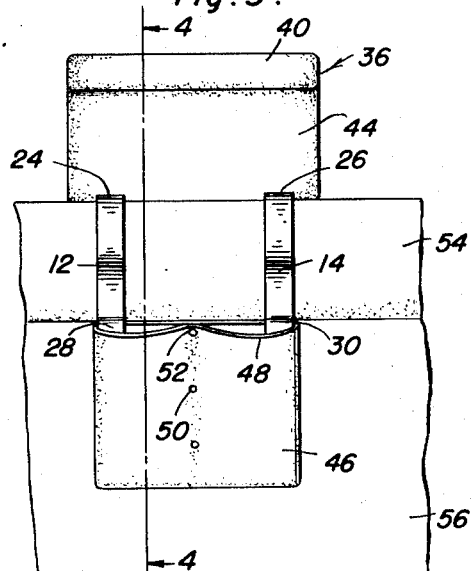
Inventor
Sylvia C. Alexander
By *Clarence A. O'Brien and Harvey B. Jacobson*
Attorneys Patented Sept. 4, 1951

2,566,757

UNITED STATES PATENT OFFICE 2,566,757

HEADREST

Sylvia C. Alexander, Ukiah, Calif.

Application March 19, 1948, Serial No. 15,799

1 Claim. (Cl. 155—174)

This invention relates to new and useful improvements in head rests and the primary object of the present invention is to provide a head rest including novel and improved means for quickly and readily applying or removing the same from the upper portion of a chair and more particularly, the back rest of a vehicle seat.

Another important object of the present invention is to provide a head rest for the back rest of a vehicle seat including a seat engaging member and a novel and improved removable head support cushion carried by the seat engaging member, which is so designed as to facilitate the convenient cleaning thereof in a practical manner.

Another object of the present invention is to provide a head rest attachment for the back rests of vehicle seats that is so constructed as to facilitate the placement of the same upon a vehicle seat without obstructing the visibility of persons seated behind the seat on which the same is applied.

A further object of the present invention is to provide a head rest including a seat engaging frame and an article holding bag or pocket removably carried by the frame that will hold articles in a conveniently accessible position.

A still further aim of the present invention is to provide a head rest for vehicle seats that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the head rest constructed in accordance with the present invention;

Figure 2 is a perspective view of the present invention, and showing the head cushion member and article holding pocket removed therefrom;

Figure 3 is a fragmentary front elevational view of a vehicle seat, and showing the present invention applied thereto; and, Figure 4 is a vertical sectional view taken substantially on the plane of section line 4—4 of Figure 3.

Referring now to the drawings in detail, wherein for the purpose of illustration, there is disclosed a preferred embodiment of the present invention, the numeral 10 represents the main frame or anchoring element of the present invention generally, comprising a pair of spaced, resilient, arcuate or U-shaped arms 12 and 14, the forward terminals 16 and 18 of which are fixedly secured to a substantially rectangular support plate 20. The upper portion 22 of the support plate projects outwardly and upwardly from the web or central portions 24 and 26 of the arms 12 and 14 for a purpose which will later be more fully apparent.

The rear terminals of the arms 12 and 14 are integrally formed with elongated extensions 28 and 30, the free ends of which are connected by a lower cross-bar 32 disposed on the inner face of the extensions. The ends of the extensions 28 and 30 which are joined to the arms 12 and 14 are connected by an upper cross-bar 34 that is disposed on the opposite faces of the arms 12 and 14 from the bar 32.

The numeral 36 represents a substantially wedge-shaped cushion member including padding 38 which is provided with a washable covering 40, the rear portion of which is provided with an opening 42 to form a sleeve 44 that frictionally engages the upper portion 22 of the plate 20.

Loosely embracing the extensions 28 and 30, is a flexible pocket or bag 46 which is open at its upper end 48. The central portion of the bag 46 supports snap fasteners 50, the upper of which, namely 52, is disposed above the upper bar 34 to retain the bag fixed to the extensions 28 and 30.

In practical use of the present invention, the arms 24 and 26 are frictionally engaged over the upper end 54 of the back rest portion 56 for a conventional vehicle seat. In this position, the bag 46 will be disposed rearwardly of the back rest 56 and the cushion member 36 will frictionally engage the forward and upper portion of the back rest 56. It should be noted, that only a portion of the cushion member 36 will extend above the upper portion 54 of the back rest 56 to offer very little obstruction to persons seated behind the back rest 56.

The pocket 46 may be quickly and readily disengaged from the extensions 28 and 30 by unsnapping the fasteners 50 and 52 so that the same may be conveniently cleaned or washed in a satisfactory manner. The cushion member 36 may also be disengaged from the support 20 by merely raising the said cushion member relative to the support, whereby a cleaning of the cushion member may be effected by a brush or with a cleaning fluid if such is desirable.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention what is claimed as new is:

A head rest attachment for chairs comprising a plurality of U-shaped resilient anchor members each having front and rear arms for yieldingly engaging the upper portion of a chair, a substantially rectangular frame carried by the rear arms, a substantially rectangular support plate carried by the front arms, a cushion member having a rear wall, and a covering for the cushion member including a rear portion with a slot therein, said support plate being received in said slot and disposed between the rear portion of said covering and the rear wall of said cushion member.

SYLVIA C. ALEXANDER.

REFERENCES CITED

The following references are of record in the file of this patent:

UNITED STATES PATENTS

| Number | Name | Date |
|---|---|---|
| 283,533 | Taylor | Aug. 21, 1883 |
| 332,154 | Jewett | Dec. 8, 1885 |
| 344,248 | Cawley | June 22, 1886 |
| 394,649 | Harrison | Dec. 18, 1888 |
| 409,389 | Campbell | Aug. 20, 1889 |
| 1,286,822 | Sprung | Dec. 3, 1918 |
| 2,001,396 | Pumphrey | May 14, 1935 |

FOREIGN PATENTS

| Number | Country | Date |
|---|---|---|
| 448,358 | Great Britain | June 8, 1936 |